3,377,310
COATING COMPOSITIONS CONTAINING CROSS-
LINKABLE POLYAMIDES DISSOVLED IN PHE-
NOLIC SOLVENTS
Irving Serlin, Springfield, Edward Lavin, Longmeadow, and Albert H. Markhart, Wilbraham, Mass., assignors, by mesne assignments, to Monsanto Company, a corporation of Delaware
No Drawing. Filed Oct. 22, 1964, Ser. No. 405,843
11 Claims. (Cl. 260—33.4)

ABSTRACT OF THE DISCLOSURE

Disclosed herein is a process for forming a stable solution of a polyamide acid in a phenolic solvent which comprises reacting an aromatic dianhydride and a diamine in a phenolic medium in the presence of a tertiary amine.

This invention relates to stable phenolic solutions of polyamides containing an excess of carboxyl groups, said polyamide-acid compounds being capable of cure to insoluble, infusible, flexible, tough, adherent, dielectric materials. More particularly, the invention relates to a process for forming polyamides in the presence of phenols by the partial condensation of dianhydrides with di-primary amines, and to the solutions produced thereby.

Polyamides are well known to the art and, although they have found wide use in a variety of applications, they suffer from several deficiencies. For example, the oxidative stability of aliphatic polyamides is not good. Aromatic polyamides are better in this respect but then their poor solubility and their high melting point renders them rather difficult to process. In addition, the known polyamides are not readily crosslinked, i.e. converted into an insoluble and infusible solid state, a very desirable property in many applications.

These problems have been resolved with some satisfaction by the creation of certain new polyamide-acids, i.e. polyamides containing an excess of carboxyl groups available for further reactions such as crosslinking. These resins are prepared from dianhydrides and di-primary amino compounds. These monomers are first condensed to a polyamide stage. They can be stored in that state until use, i.e. application to a substrate and subsequent heat cure to an insoluble, infusible and dielectric product that is of great interest in the electrical insulation field.

As is often the case however, these improvements give rise to new problems in the art that they were meant to advance. For instance, the first stage condensation of the monomers to the polyamide-acid state must be carried out in inert polar solvents which are compatible with both the starting materials and the product. These requirements in effect restrict the choice of reaction media to relatively expensive chemicals such as N-methylpyrrolidone and dimethylacetamide. More seriously, it excludes, in theory, the low cost cresylic acid solvent system which is almost classical in the magnet wire coating field, an industry for which many of the resins involved were developed. Indeed, it is not difficult to imagine a reaction between dianhydrides and phenolic compounds such as cresylic acid and it can certainly be expected that such a reaction would interfere with the formation of the polyamide-acid that is desired.

Yet, in spite of these logical expectations, the polymerizations of interest have been attempted in phenolic solvents and the attempts have met with qualified success. Compounds like 3,3',4,4' - benzophenonetetracarboxylic dianhydride and 4,4'-oxydianiline have been made to react together in cresylic acid and phenol to produce clear solutions of polyamide-acid without without apparently too much interference from the phenolic solvents. The polymerizations however have had to be carried out at temperatures in the vicinity of 90° C. in contrast to the maximum of about 50° C. which is normally necessary to keep such monomer systems from reacting significantly beyond the polyamide stage. A rather undesirable result of this particular process has been that the polyamide-acids produced from such systems have uncommonly short shelf life, a phenomenon which subtracts greatly from their potential usefulness.

It is therefore an object of the invention to provide a simple, reliable method of preparing solutions of polyamide-acid resins in phenolic solvents. It is another object to provide stable solutions of polyamide-acid resins in phenolic solvents, said resins being cable of further reaction to an insoluble, infusible and dielectric condition.

These and other objects which shall become evident in the course of this disclosure have been accomplished by incorporating catalytic amounts of a tertiary amine, e.g. pyridine, in the dianhydride-diamine-phenol polymerization systems just mentioned. It has been noted that in the presence of such an additive, the polymerization reaction unexpectedly goes smoothly at ambient temperature and yields stable polyamide-acid resin solutions with a greatly extended shelf life which can yet be doubled or tripled by the addition of aqueous ammonia.

The invention is further illustrated but not limited by the following examples. All parts and percentages given therein are on a weight besis.

Example 1

The reaction was carried out under ambient conditions of temperature and humidity. No attempt was made to exclude moisture and crude raw materials were used. The equipment consisted of a one-gallon glass jar, a stainless steel stirrer mounted on a Craftsman No. 150 drill press and a thermometer for measuring the exotherm.

A charge containing 13% solids and consisting of the following materials was employed:

| Basic component: | Grams |
|---|---|
| 4,4'-methylenedianiline (MDA) | 95 |
| Phenol (at 45° C.) | 432 |
| Cresylic acid | 288 |
| Pyridine | 26 |

Acid component:
Benzophenonetetracarboxylic dianhydride
  (BTDA) _____ 154.7

| Diluent: | |
|---|---|
| Solvesso 100 (naphtha) | 300 |
| Phenol (at 45° C.) | 378 |
| Cresylic acid | 252 |

The basic component was placed in the jar and stirred at 300 r.p.m. The solid BTDA was added and the stirring speed was increased to 1500 r.p.m. After 2 minutes, the temperature rose from 25° C. to 48° C. and the BTDA dissolved. The stirring rate was increased to 3000 r.p.m. and the temperature rose to 65° C. after 20 minutes from the beginning of the reaction. The diluent was then added and the stirring was maintained at 3000 r.p.m. for an additional period of 50 minutes during which time the reaction temperature changed to 48° C. The resulting solution was filtered through a crimped surface paper on a Buchner funnel.

It had a Brookfield viscosity of 2500 centipoises which decreased gradually upon storage at room temperature to a level of 600 centipoises in 7 days. The inherent viscosity of the material at 0.5% concentration ranged from 0.4 to 0.5 and was not affected by aging.

Example 2

The polyamide-acid solution of Example 1 was applied to AWG No. 18 copper wire (0.043 inch diameter) and cured by standard wire enameling techniques. The speed of the wire through the curing tower was held at 14 feet per minute and the temperature gradient in the tower ranged from 200 to 400° C. Six successive coats of the solution were applied to the wire to give it a "heavy build," in this case an increase of 2.9 mils in total diameter.

The results of some of the tests carried out on wires so prepared with the enamel of Example 1 after it had aged 12 and 33 days are reported in the next table.

| Example 1 enamel (days at room temperature) | 12 days | 33 days |
| --- | --- | --- |
| Surface | Rough | Smoother |
| Flexibility, 25% elongation | 2x | 2x |
| Jerk test | Passes | Passes |
| Abrasion test, average/minimum strokes | 101/49 | 45/30 |
| Toluene-alcohol boil test | Passes | Passes |
| Cut-through, ° C | 375 | 355 |
| Heat shock, 300° C | P1x | P1x |
| Flex, 180° C., hours | 108 | 72 |
| Dielectric life, 300° C., hours | 369 | 687 |
| Dielectric breakdown, dry, volts | 3,470 | 3,260 |
| Dielectric breakdown, wet, volts | 1,600 | 1,550 |
| Burn-out, 115 volts | 46 | 65 |

It becomes evident on examination of the above test results that wire coated with 33 day old enamel is quite acceptable and is almost as good as the 12 day material. In fact, there is a distinct improvement in certain properties such as dielectric life upon aging of the coating solution.

In contrast to this performance, polyamide-acid materials prepared according to the formation and the procedure of Example 1 but without pyridine could not yield satisfactory magnet wire after 10 days of aging.

It should be noted that all the tests carried out are standard tests and that all the results reported in the above tables are acceptable. Further description of such tests is therefore considered superfluous.

Example 3

It was found that the shelf life of the polyamide-acid solutions of the invention could be prolonged significantly by adding to the enamel approximately 0.15 to 0.45 (preferably about 0.25) of the equivalent of aqueous ammonia necessary to neutralize the theoretical amount of free carboxyl groups present in the BTDA–MDA polyamide-acid stage (assuming no crosslinking or cyclic imide formation). More specifically, upon adding with stirring 2 parts of 6 N ammonium hydroxide to 100 parts of 1 to 5 day old polyamide-acid phenolic solution prepared as in Example 1 (containing 0.05 equivalent of free carboxyl groups), the thus stabilized enamel had a shelf life of approximately 90 days at room temperature. This compares very favorably with the 30 day or so life that is normal for this type of preparation. Wire coated with the stabilized material after aging 90 days had properties virtually unchanged from those reported in the table above. Similarly, the life of the polyamide-acid enamel on aging at 45° C. (steam cabinet temperature) was extended from about 35 hours to about 80 hours by this stabilization procedure.

Example 4

Another stable solution of a polyamide-acid in phenols was prepared as follows:

35 parts of ethylenediamine were dissolved in a mixture of 600 parts cresol, 400 parts phenol and 42 parts tripropylamine. This solution was stirred gently as 184 parts of benzophenone tetracarboxylic dianhydride were dissolved. Upon solution, agitation was increased and an exothermic reaction proceeded. Stirring was discontinued when the temperature decreased. The filtered solution had a Brookfield viscosity of 3600 centipoises at 25° C.

The dianhydrides that can be used in the formation of the polyamide-acids of this invention can best be described as multi-ring tetracarboxylic aromatic dianhydrides in which the carboxyl groups are arranged in such a manner that they can form two anhydride groups with each of these groups being on a different ring. The rings may be fused, attached to one another as those of biphenyl or joined by a "bridge" or divalent radical composed of atoms or groups which are substantially unreactive toward amino groups at the temperature employed in the formation of the polyamide-acid products. Typical linkages include, in addition to the carbonyl bridge of the benzophenone compound used in Example 1, are such atoms and groups as —NH—, —O—, —S—, —$SO_2$—, —$CH_2$— and —$C(CH_3)_2$—. There are obviously other satisfactory compounds since this bivalent linkage is not involved in the polymerization reaction with which the invention is concerned.

Some typical usable carboxylic dianhydrides of aromatic compounds having more than one ring and with each dianhydride on a different ring include in addition to the benzophenone tetracarboxylic dianhydrides, 3,4,3', 4'-diphenylmethane tetracarboxylic dianhydride, 3,3',4,4'-diphenyl tetracarboxylic dianhydride, bis(3,4,-dicarboxyphenyl) ether dianhydride, bis(3,4-dicarboxyphenyl) sulfone dianhydride, 2,2-bis(3,4-dicarboxyphenyl) propane dianhydride, bis(3,4-dicarboxyphenyl) sulfide, 1,2,5, 6,-naphthalene tetracarboxylic dianhydride, and the like, and mixtures thereof.

The basic component of the polyamide-acids can be selected from diamino compounds having the general formula $H_2N$—R—$NH_2$ wherein R may be an aliphatic or an aromatic bivalent radical. Because the cured polymers produced from these solutions are most advantageously used as high temperature resistant materials, it is preferred to use aromatic amines, especially those containing no aliphatic hydrogen atoms. Similarly it is preferred to use short chain aliphatic amines. Small amounts of triamines may also be included with these diamines.

The aromatic primary diamines may be those wherein R stands for the bivalent radical derived from such materials as biphenyl, benzene, naphthalene, diphenyl ether, diphenyl sulfide, diphenyl sulfone, benzophenone, diphenyl methane, diphenyl propane, substituted benzenes and so on. The usable diamines may be selected from amines containing 6 to 16 carbon atoms, such as, phenylene diamine, xylylene diamines, benzidine, 4,4'-diaminodiphenyl ether (oxydianiline); 4,4'-diamino-diphenyl sulfone; 3,3'-diamino-diphenyl sulfide; 4,4'-diamino-diphenyl methane (methylenedianiline); 3,3' - diamino - diphenyl propane, 3,3'-diamino-benzophenone; 1,5-diamino-naphthalene, benzoguanamine, and the like, and mixtures thereof.

The aliphatic diamines may be selected from saturated amines containing from 1 to about 6 carbon atoms, such as, hexamethylenediamine, 2,2-dimethyl propylene diamine, butylenediamine, diamino-propane, ethylenediamine, methylenediamine and the like, and mixtures thereof.

The proportions of monomers in the solutions of this invention can vary, on a molar basis, from about a 5% excess of the dianhydride to about a 15% of the diamino compound. Preferred however are chemically equivalent amounts of both types of monomers or a molar excess of the amine of up to 5%.

The condensation of the dianhydride with the diamino compound to the polyamide-acid resin is catalyzed by tertiary amines, such as pyridine, 3-picoline, quinoline, tripropylamine, and so on. The aromatic N-heterocyclic amines are preferred. In the absence of such compounds from the cresylic acid solution of the reactants, temperatures of 85–90° C. must be employed. This, as we have seen, leads to the formation of a polymeric product solution having an undesirably short shelf life. An excess of catalyst will, on the other hand, permit the reaction to occur at the preferred temperature but again will shorten the life of the product, a consideration which may not matter too much if the polymer solution is used promptly. With these considerations in mind therefore, it has been established that the preferred tertiary amine concentration should be within the range of about 0.5 to about 10% of the total charge weight. The concentration of monomers in the charge may vary from about 10 to about 30% by weight.

It should be noted that although the preparation of these polymer solutions in phenolic solvents in the presence of a tertiary amine is readily accomplished at ambient temperatures (temperature of reaction) they may be conducted at higher temperatures. This, however, adversely effects the stability of the solution product. It is therefore preferred to carry out the reaction at temperatures below 85° C. Further, the tertiary amine should be added to the reaction solution prior to the addition of the dianhydride or at least simultaneously therewith, in order to prevent premature gelling and to insure the formation of stable solutions.

The polyamide-acid solutions of the invention have a Brookfield viscosity ranging from 100 to 5000 centipoises at 25° C. when containing about 10% to 30% polymer. The usable solvents are limited of course to those phenols that are liquid near room temperature, preference being given to phenol, and cresylic acid. A minor amount of high boiling hydrocarbon solvent, e.g. Solvesso 100 (a petroleum hydrocarbon composed principally of alkyl benzenes with a boiling point range of about 150–184° C.) may be used to give smoother coating of cured product. When used in large amounts however, it shortens the shelf life of the polyamide-acid solution. Phenol, on the other hand, increases the shelf life of the product but it will crystallize out of the enamel if used in excess amounts. The phenol content of the phenolic solvent will therefore be limited to a maximum of 70%. The use of cresylic acid as the sole solvent has given dark-banded magnet wire. With respect to wire enamel, the preferred solvent mixture should contain approximately 40 to 60% by weight phenol. The hydrocarbon solvents which may be included have a range of boiling points between about 100° to about 190° C. and are restricted to a maximum amount of about 20% of the total solvents. It is obvious that these figures are subject to vary with the amount and nature of monomers used. In general however, it can be said that the phenolic part of the solvent mixture should constitute the major portion of the solvent mixture.

The polyamide-acid resins in the solutions of this invention can be cured into insoluble and infusible products at temperatures within the range of 200 to 500° C., the selection of the actual temperature for a given preparation being dependent in practice on the equipment used for the cure, the timing of the process, the degree of cure desired and the nature of the monomers originally used.

An interesting aspect of the invention is that the presence of water did not affect the properties of the polyamide-acid solution even when added to the initial polymerization charge. Ten milliliters of water added to the basic component of the charge used in Example 1 gave a solution or enamel with an inherent viscosity of 0.44. Its shelf life and coating properties were similar to the product of Example 1. As much as about 2% water may be tolerated in the charge during the reaction or in the polymer solutions produced. This non-interference of water is rather welcome in that no special precaution need be taken with respect to ambient humidity conditions.

What has been made therefore is an "instant" wire enamel or coating composition which can be made very quickly and simply without purification of monomers and without special precautions. This is rather unusual in the field of polymerization where monomers must usually be highly purified, anhydrous conditions must be maintained and where problems of solubility of polymers are quite common.

As to the uses of the solutions beyond wire enameling and surface coating, their excellent and unusual properties make them available for such varied applications as impregnation of glass and other fabrics, the formation of molded products, as adhesives, etc. In many applications, especially in surface coating, they may be employed in conjunction with other natural and synthetic resins, in multiple coated magnet wire for instance. Numerous other applications may be imagined by those skilled in the art without departing from the spirit of the invention.

What is claimed is:

1. A process of forming a stable solution of polyamide-acid polymer which comprises dissolving a multi-ring aromatic carboxylic dianhydride having each anhydride group on different rings and a primary diamine in a solvent comprising at least 80% of a mixture of phenols consisting of 30 to 100% by weight cresylic acid and 0 to 70% phenol, and containing 0.5 to about 10% of the total weight of the solution of a tertiary amine, and stirring until the polyamide-acid is formed.

2. A process of forming a stable solution of polyamide-acid polymer having a polymer content of 10 to 30% by weight and a Brookfield viscosity of 100 to 5,000 centipoises at 25° C., said process comprising dissolving, while stirring
    (a) a multi-ring aromatic carboxylic dianhydride having each anhydride group on different rings
    (b) in a solution of a primary diamine taken from the class consisting of aromatic diamines having 6 to 16 carbon atoms and saturated aliphatic diamines having 1 to 6 carbon atoms
    (c) in a solvent comprising at least 80% of a mixture of phenols consisting of 30 to 100% cresylic acid and 0 to 70% phenol
    (d) and containing, by weight of the total solution formed 0.5 to 10% of a tertiary amine, and continuing stirring of the solution until the polyamide-acid polymer has been formed, said dianhydride being added in an amount approximately equimolar to the diamine in solution.

3. A process as in claim 2 wherein up to about 2% water is present in the total solution.

4. A process as in claim 2 wherein aqueous ammonia is added after the polyamide-acid polymer has been formed in an amount approximately equal to 0.15 to 0.45 of the equivalent necessary to neutralize the theoretical amount of free carboxyl groups present in the polymer.

5. The process as in claim 2 wherein the tertiary amine is selected from the group consisting of pyridine, picoline, quinoline and tripropylamine.

6. A process as in claim 2 wherein the solvent consists of 40 to 60% by weight phenol and 60 to 40% cresylic acid.

7. A process as in claim 2 wherein the diamine is an aromatic diamine.

8. A process as in claim 2 wherein the dianhydride is benzophenone tetracarboxylic dianhydride.

9. A process as in claim 7 wherein the dianhydride is benzophenone tetracarboxylic dianhydride.

10. A process as in claim 9 wherein the diamine is taken from the group consisting of oxydianiline and methylene dianiline.

11. A wire enamel prepared by the process of claim 6.

References Cited

UNITED STATES PATENTS

| 3,073,785 | 1/1963 | Angelo | 252—519 |
| 3,190,856 | 6/1965 | Lavin et al. | 260—65 |
| 3,277,043 | 10/1966 | Holub. | |

FOREIGN PATENTS 942,025   11/1963   Great Britain.

MORRIS LIEBMAN, *Primary Examiner.*

R. S. BARON, *Assistant Examiner.*